US012551415B2

(12) United States Patent
Cavailles et al.

(10) Patent No.: US 12,551,415 B2
(45) Date of Patent: Feb. 17, 2026

(54) COSMETIC COMPOSITION IN THE FORM OF A WATER-IN-OIL EMULSION FOR TREATING HAIR TO IMPROVE COMBING

(71) Applicant: SOCIETE D'EXPLOITATION DE PRODUITS POUR LES INDUSTRIES CHIMIQUES SEPPIC, Paris (FR)

(72) Inventors: Maïté Cavailles, Castres (FR); Marie-Laure Breton, Castres (FR); Emmanuelle Merat, Castres (FR)

(73) Assignee: SOCIETE D'EXPLOITATION DE PRODUITS POUR LES INDUSTRIES CHIMIQUES SEPPIC, Paris (FR)

( * ) Notice: Subject to any disclaimer, the term of this patent is extended or adjusted under 35 U.S.C. 154(b) by 1209 days.

(21) Appl. No.: 17/283,193

(22) PCT Filed: Sep. 25, 2019

(86) PCT No.: PCT/FR2019/052255
§ 371 (c)(1),
(2) Date: Apr. 6, 2021

(87) PCT Pub. No.: WO2020/070410
PCT Pub. Date: Apr. 9, 2020

(65) Prior Publication Data
US 2021/0346250 A1 Nov. 11, 2021

(30) Foreign Application Priority Data
Oct. 1, 2018 (FR) ........................................ 1859055

(51) Int. Cl.
| | |
|---|---|
| *A61K 8/06* | (2006.01) |
| *A61K 8/37* | (2006.01) |
| *A61K 8/85* | (2006.01) |
| *A61K 8/86* | (2006.01) |
| *A61K 8/88* | (2006.01) |
| *A61K 8/92* | (2006.01) |
| *A61Q 5/00* | (2006.01) |
| *A61Q 5/12* | (2006.01) |

(52) U.S. Cl.
CPC .............. *A61K 8/064* (2013.01); *A61K 8/375* (2013.01); *A61K 8/85* (2013.01); *A61K 8/86* (2013.01); *A61K 8/88* (2013.01); *A61K 8/922* (2013.01); *A61Q 5/12* (2013.01); *A61Q 5/004* (2013.01)

(58) Field of Classification Search
CPC .......... A61K 8/064; A61K 8/375; A61K 8/85; A61K 8/86; A61K 8/88; A61K 8/922; A61K 8/8158; A61Q 5/12; A61Q 5/004; C08F 2/32; C08F 220/60; C08F 220/20; C08F 220/286; C08F 222/102
See application file for complete search history.

(56) References Cited

U.S. PATENT DOCUMENTS

| | | | |
|---|---|---|---|
| 2002/0146438 A1 | 10/2002 | Bleckmann et al. | |
| 2004/0162405 A1* | 8/2004 | Braun | ................... D06P 1/5242 526/264 |
| 2007/0219315 A1 | 9/2007 | Braun | |
| 2012/0172457 A1* | 7/2012 | Braun | ................. C08F 220/585 526/287 |

FOREIGN PATENT DOCUMENTS

| | | |
|---|---|---|
| EP | 1 961 455 | 8/2008 |
| JP | 2001-002925 | 1/2001 |
| JP | 2012052119 A | 3/2012 |
| JP | 2013063959 A | 4/2013 |
| WO | 96/00719 | 1/1996 |

OTHER PUBLICATIONS

Donald Voet and Judith G. Voet, "Biochemistry," John Wiley & Sons, 1990, p. 250.
International Search Report for PCT/FR2019/052255 dated Feb. 5, 2020, 5 pages.
Written Opinion of the ISA for PCT/FR2019/052255 dated Feb. 5, 2020, 6 pages.
Office Action issued in Japanese Patent Application No. 2021-515572, dated Aug. 29, 2023.

\* cited by examiner

*Primary Examiner* — Snigdha Maewall
(74) *Attorney, Agent, or Firm* — NIXON & VANDERHYE

(57) ABSTRACT

Disclosed is a cosmetic composition which is in the form of an emulsion of water-in-oil type including, per 100% of its mass: from 60% to 95% by mass of a gelled aqueous phase including at least one crosslinked cationic polyelectrolyte; from 5% to 40% by mass of a fatty phase including at least one oil and an emulsifying system including a combination of at least one emulsifying surfactant selected from the elements of the group consisting of compositions of alkylpolyglycosides, compositions of alkylpolyglycosides and of fatty alcohols, polyglycerol esters, alkoxylated polyglycerol esters, polyglycol polyhydroxystearates, polyglycerol polyhydroxystearates, and alkoxylated polyglycerol polyhydroxystearates.

12 Claims, No Drawings

COSMETIC COMPOSITION IN THE FORM OF A WATER-IN-OIL EMULSION FOR TREATING HAIR TO IMPROVE COMBING

CROSS-REFERENCE TO RELATED APPLICATIONS

This application is the U.S. national phase of International Application No. PCT/FR2019/052255 filed Sep. 25, 2019 which designated the U.S. and claims priority to FR 1859055 filed Oct. 1, 2018, the entire contents of each of which are hereby incorporated by reference.

BACKGROUND OF THE INVENTION

Field of the Invention

The present invention relates to a cosmetic composition which is in the form of an emulsion of water-in-oil type comprising at least one thickener of crosslinked cationic polyelectrolyte type, and intended to be used for facilitating the combing of locks of hair.

The scalp is protected by a hydrolipid film, located at the surface of the epidermis, and consisting of sebum and sweat. This hydrolipid film protects the scalp against external attacking factors and dehydration. This hydrolipid film, which acts as a lubricant, spreads along the hair stalk and also protects the hair, by smoothing the hair fiber scales and thus making the hair shiny and supple.

When the secretions of sebum are insufficient, the hydrolipid film changes, which has the consequence of gradually impairing the cuticle and the keratinized cells which lose their water. A strong decrease in the elasticity of keratin and raising of the hair scales are then observed. The hair stalk degrades to the very interior of the fiber, and the hair becomes dry and brittle.

On the scalp, following insufficient secretions of sebum, the cornified layer dries out and loses its suppleness, which causes skin discomfort which is manifested by the appearance of irritation, redness and tautness.

Without these secretions of sebum, the scalp becomes smooth and the presence of squamae (dry flakes) is occasionally observed.

The hair follicles of frizzy hair types produce little sebum. This is why this frizzy hair type is often dry and dehydrated. It is thus necessary to "nourish" it several times a week, with creams or oils, thus supplying fatty phases to the dry areas of the scalp.

When compared with Caucasian hair, frizzy hair is characterized by an increased water deficiency, and the scalp, which is genetically ultra-dry, is more vulnerable and very sensitive. The secretion of sebum is physiologically low for all children up to the age of puberty, and for frizzy and curly hair types this deficiency in sebum production is reflected by insufficient lubrication of the scalp and the virtual absence of a hydrolipid film and thus of protection of the hair fibers. The cuticle, consisting of flat cells that are superposed like scales, becomes impaired and the cohesion between the cells is broken; a loss of amino acids takes place, including sulfur. On styling and on disentangling, the scalp becomes painful and the hair strands readily form knots and attach to the comb. The time devoted to controlling this hair is longer and is a daily source of inconvenience for styling, notably for children.

The purpose of treating the hair after washing with shampoos is to make the hair manageable, to reduce the dryness of the scalp, to reduce the brittleness of the hair, to improve the sheen of the hair, and to facilitate the combing and/or disentangling of the hair.

Description of the Related Art

One solution, often employed by certain African ethnic groups, consists in using oils alone. This treatment method has major drawbacks associated with the transfer of the product onto the fingers, the clothing and pillows; furthermore, the oiled hair picks up more dust, producing an obvious unesthetic appearance.

Another solution, notably used in Brazil, is to use conditioners as an emulsion; notably emulsions of oil-in-water type or water-in-silicone type which contain cationic compounds.

These conditioners are easy to apply and to use, but they have the drawback of not being sufficiently efficient.

There is thus a need to develop compositions for treating dry hair and the scalp, more particularly for frizzy hair, to improve the ease of styling of the hair, to reduce the dryness of the scalp, to reduce the brittleness of the hair, to improve the sheen of the hair, and more particularly to facilitate the combing and/or disentangling of the hair.

The solutions proposed in the prior art for preparing cosmetic compositions for treating dry hair and the scalp, which are intended to improve the combing and/or disentangling of such hair, require the inclusion of specific fatty phases. Among these fatty phases, mention may be made of fatty phases which are silicone derivatives, and which may be used either directly on the hair, or in the form of an oily mixture containing same, or in the form of an emulsion containing same.

Emulsions are preferred forms since they also make it possible to convey both the water-soluble substances and liposoluble substances that are commonly used in these applications. A distinction is made between oil-in-water (O/W) emulsions in which the continuous phase consists of a hydrophilic phase, generally an aqueous phase, and the dispersed phase consists of a lipophilic fatty phase, and water-in-oil (W/O) emulsions in which the continuous phase consists of a lipophilic fatty phase and the dispersed phase consists of a hydrophilic phase, generally an aqueous phase.

Oil-in-water emulsions are intrinsically more stable than water-in-oil emulsions; water-in-oil emulsions nevertheless have a number of advantages. Specifically, the separation between the water droplets reduces the possibility of the proliferation of microorganisms. Furthermore, the use of preserving agents, which is essential when the continuous phase is aqueous, can be avoided or reduced when the continuous phase is fatty. Water-in-oil emulsions are far less sensitive to low temperature than oil-in-water emulsions. Lastly, for topical applications for cosmetic use, the European patent application published under the number EP 1961455 A1 discloses that an oily continuous phase makes it possible to cover the skin after application of the water-in-oil emulsion, which protects the skin from dehydration and against external substances by forming a persistent oily film, thus making it possible to treat dry skin.

The solutions proposed in the prior art for preparing cosmetic emulsions intended for treating the hair and/or the scalp which are in the water-in-oil form are not satisfactory because either the silicone derivatives employed are volatile and may have harmful effects with regard to the environment and the users, or the silicone derivatives employed are not very volatile and they then impart unpleasant sensory properties after topical application, for instance tacky sensations on the skin.

The technical problem is thus that of developing a novel composition in the form of an emulsion of water-in-oil type which is not characterized by the drawbacks presented above, which remains homogeneous at room temperature (25° C.) and at 45° C. after storage for a minimum of three months, and which can facilitate the combing and/or disentangling of the hair.

SUMMARY OF THE INVENTION

One solution of the present invention is a cosmetic composition (C1) which is in the form of an emulsion of water-in-oil type comprising, per 100% of its mass:
from 60% to 95% by mass of a gelled aqueous phase (A1) comprising at least one crosslinked cationic polyelectrolyte which comprises a proportion of greater than or equal to 5 mol % of monomer units derived from an element from the group consisting of 2,N,N,N-tetramethyl-2-[(1-oxo-2-propenyl)amine]propanammonium chloride (AMPTAC), 2,N,N-trimethyl-2-[(1-oxo-2-propenyl)amine]propanammonium chloride and N,N,N-trimethyl-3-[(1-oxo-2-propenyl)amino]propanammonium chloride (APTAC).

from 5% to 40% by mass of a fatty phase (A2) comprising at least one oil and an emulsifying system comprising a combination of at least one emulsifying surfactant (S) selected from the elements of the group consisting of compositions of alkylpolyglycosides, compositions of alkylpolyglycosides and of fatty alcohols, polyglycerol esters, alkoxylated polyglycerol esters, polyglycol polyhydroxystearates, polyglycerol polyhydroxystearates, and alkoxylated polyglycerol polyhydroxystearates.

In the definition of the composition (C1) which is a subject of the present invention, the term "crosslinked cationic polyelectrolyte (CP)" denotes a nonlinear crosslinked cationic polyelectrolyte, which is in the form of a three-dimensional network which is insoluble in water but swellable in water and which leads to the production of a chemical gel.

In the definition of the cosmetic composition (C1) which is a subject of the present invention, the term "oil" denotes a compound and/or a mixture of compounds which is insoluble in water and which is liquid at 25° C., and more particularly:
linear alkanes including from 11 to 19 carbon atoms;
branched alkanes including from 7 to 40 carbon atoms, such as isododecane, isopentadecane, isohexadecane, isoheptadecane, isooctadecane, isononadecane or isoeicosane, or mixtures of some of them such as those mentioned below and identified by their INCI name: $C_{7-8}$ isoparaffin, $C_{8-9}$ isoparaffin, $C_{9-11}$ isoparaffin, $C_{9-12}$ isoparaffin, $C_{9-13}$ isoparaffin, $C_{9-14}$ isoparaffin, $C_{9-16}$ isoparaffin, $C_{10-11}$ isoparaffin, $C_{10-12}$ isoparaffin, $C_{10-13}$ isoparaffin, $C_{11-12}$ isoparaffin, $C_{11-13}$ isoparaffin, $C_{11-14}$ isoparaffin, $C_{12-14}$ isoparaffin, $C_{12-20}$ isoparaffin, $C_{13-14}$ isoparaffin, $C_{13-16}$ isoparaffin;
cycloalkanes optionally substituted with one or more linear or branched alkyl radicals;
white mineral oils, such as those sold under the following names: Marcol™ 52, Marcol™ 82, Drakeol™ 6VR, Eolane™ 130, Eolane™ 150;
hemisqualane (or 2,6,10-trimethyldodecane; CAS number: 3891-98-3), squalane (or 2,6,10,15,19,23-hexamethyltetracosane), hydrogenated polyisobutene or hydrogenated polydecene;
mixtures of alkanes including from 15 to 19 carbon atoms, said alkanes being linear alkanes, branched alkanes and cycloalkanes, and more particularly the mixture ($M_1$) which comprises, per 100% of its mass, a mass proportion of branched alkanes of greater than or equal to 90% and less than or equal to 100%; a mass proportion of linear alkanes of greater than or equal to 0% and less than or equal to 9%, and more particularly less than 5%, and a mass proportion of cycloalkanes of greater than or equal to 0% and less than or equal to 1%, for example the mixtures sold under the name Emogreen™ L15 or Emogreen™ L19;

the fatty alcohol ethers of formula (I):

$$Z_1-O-Z_2 \qquad (I)$$

in which $Z_1$ and $Z_2$, which may be identical or different, represent a linear or branched alkyl radical including from 5 to 18 carbon atoms, for example dioctyl ether, didecyl ether, didodecyl ether, dodecyl octyl ether, dihexadecyl ether, (1,3-dimethylbutyl) tetradecyl ether, (1,3-dimethylbutyl) hexadecyl ether, bis(1,3-dimethylbutyl) ether or dihexyl ether;

monoesters of fatty acids and of alcohols of formula (II):

$$R'_1-(C=O)-O-R'_2 \qquad (II)$$

in which $R'_1-(C=O)$ represents a saturated or unsaturated, linear or branched acyl radical including from 8 to 24 carbon atoms, and R'2 represents, independently of $R'_1$, a saturated or unsaturated, linear or branched hydrocarbon-based chain including from 1 to 24 carbon atoms, for example methyl laurate, ethyl laurate, propyl laurate, isopropyl laurate, butyl laurate, 2-butyl laurate, hexyl laurate, methyl cocoate, ethyl cocoate, propyl cocoate, isopropyl cocoate, butyl cocoate, 2-butyl cocoate, hexyl cocoate, methyl myristate, ethyl myristate, propyl myristate, isopropyl myristate, butyl myristate, 2-butyl myristate, hexyl myristate, octyl myristate, methyl palmitate, ethyl palmitate, propyl palmitate, isopropyl palmitate, butyl palmitate, 2-butyl palmitate, hexyl palmitate, octyl palmitate, methyl oleate, ethyl oleate, propyl oleate, isopropyl oleate, butyl oleate, 2-butyl oleate, hexyl oleate, octyl oleate, methyl stearate, ethyl stearate, propyl stearate, isopropyl stearate, butyl stearate, 2-butyl stearate, hexyl stearate, octyl stearate, methyl isostearate, ethyl isostearate, propyl isostearate, isopropyl isostearate, butyl isostearate, 2-butyl isostearate, hexyl isostearate, isostearyl isostearate;

diesters of fatty acids and of glycerol of formula (III) and of formula (IV):

$$R'_3-(C=O)-O-CH_2-CH(OH)-CH_2-O-(C=O)-R'_4 \qquad (III)$$

$$R'_5-(C=O)-O-CH_2-CH[O-(C=O)-R'_6]-CH_2-OH \qquad (IV)$$

in which formulae (III) and (IV) $R'_3-(C=O)$, $R'_4-(C=O)$, $R'_5-(C=O)$ and $R'_6-(C=O)$, which may be identical or different, represent a saturated or unsaturated, linear or branched acyl group including from 8 to 24 carbon atoms;

triesters of fatty acids and of glycerol of formula (V):

$$R'_7-(C=O)-O-CH_2-CH[O-(C=O)-R''_8]-CH_2-O-(C=O)-R''_9 \qquad (V)$$

in which $R'_7-(C=O)$, $R'_8-(C=O)$ and $R'_9-(C=O)$, which may be identical or different, represent a saturated or unsaturated, linear or branched acyl group including from 8 to 24 carbon atoms;

plant oils, such as phytosqualane, sweet almond oil, coconut kernel oil, castor oil, jojoba oil, olive oil, rapeseed oil, groundnut oil, sunflower oil, wheat germ oil, corn germ oil, soybean oil, cottonseed oil, alfalfa oil, poppy seed oil, pumpkin seed oil, evening primrose oil, millet oil, barley oil, rye oil, safflower oil, candlenut oil, passionflower oil, hazelnut oil, palm oil, shea butter, apricot kernel oil, beauty-leaf oil, sisymbrium oil, avocado oil, calendula oil, and oils derived from flowers or vegetables;

ethoxylated plant oils.

In addition to the oil, the cosmetic composition according to the invention may comprise a wax.

When the cosmetic composition (C1) according to the invention comprises a wax, said wax is more particularly chosen from beeswax, carnauba wax, candelilla wax, ouricoury wax, Japan wax, cork fiber wax, sugar cane wax, paraffin waxes, lignite waxes, microcrystalline waxes, lanolin wax; ozokerite; polyethylene wax; silicone waxes; plant waxes; fatty alcohols and fatty acids that are solid at room temperature; glycerides that are solid at room temperature.

Preferably, the composition according to the invention comprises at least one oil chosen from the elements of the group consisting of castor oil, liquid paraffins, olive oil, cocoyl caprylate/caprate, isopropyl myristate and capric/caprylic triglyceride.

Depending on the case, the composition according to the invention may have one or more of the characteristics below:

the gelled aqueous phase (A1) comprises, per 100% of its mass, from 0.1% to 7% by mass of a crosslinked cationic polyelectrolyte (CP) and from 93% to 99.9% by mass of water, preferably from 0.5% to 5% by mass of a crosslinked cationic polyelectrolyte (CP) and from 95% to 99.5% by mass of water, even more preferentially from 0.5% to 3% by mass of a crosslinked cationic polyelectrolyte (CP) and from 97% to 99.5% by mass of water, the crosslinked cationic polyelectrolyte (CP) comprises, per 100 mol %:

a1) from 5 mol % to 60 mol %, preferably from 40 mol % to 60 mol % and even more preferentially from 45 mol % to 60 mol % of monomer units derived from an element from the group consisting of 2,N,N,N-tetramethyl-2-[(1-oxo-2-propenyl)amine]propanammonium chloride (AMPTAC), 2,N,N-trimethyl-2-[(1-oxo-2-propenyl)amine]propanammonium chloride and N,N,N-trimethyl-3-[(1-oxo-2-propenyl)amine]propanammonium chloride (APTAC), a2) from 0.1 mol % to 5 mol %, preferably from 0.1 mol % to 3 mol % and even more preferentially from 0.5 mol % to 3 mol % of monomer units derived from at least one monomer of formula (VI):

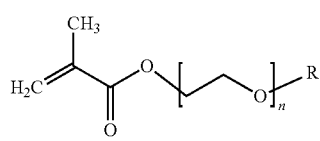

(VI)

in which R represents a linear or branched alkyl radical including from 8 to 20 carbon atoms and n represents an integer greater than or equal to 0 and less than or equal to 20;
a3) from 35 mol % to 94.9 mol %, preferably from 37 mol % to 59.9 mol % and even more preferentially from 37 mol % to 54.5 mol % of monomer units derived from at least one neutral monomer chosen from the elements of the group consisting of acrylamide, N,N-dimethylacrylamide, methacrylamide, N-isopropylacrylamide, 2-hydroxyethyl acrylate and 2-hydroxyethyl methacrylate;
a4) a proportion of greater than 0 mol % and less than or equal to 1 mol % of monomer units derived from at least one diethylenic or polyethylenic crosslinking monomer (AR);

the sum of said molar proportions of monomer units according to a1), a2), a3) and a4) being equal to 100 mol %;

the crosslinked cationic polyelectrolyte (CP) comprises, per 100 mol %, from 5 mol % to 60 mol %, more particularly from 40 mol % to 60 mol % and even more particularly from 45 mol % to 60 mol % of monomer units derived from N,N,N-trimethyl-3-[(1-oxo-2-propenyl)amino]propanammonium chloride (APTAC);

in the composition (C1) as defined above, said neutral monomer is chosen from acrylamide, N,N-dimethylacrylamide, 2-hydroxyethyl acrylate and 2-hydroxyethyl methacrylate; the neutral monomer will preferably be 2-hydroxyethyl acrylate;

in formula (VI) of the monomer present in said crosslinked cationic polyelectrolyte (CP) included in the composition (C1) which is a subject of the present invention, the term "linear or branched alkyl radical including from 8 to 20 carbon atoms" more particularly denotes, for R:

either a radical derived from linear primary alcohols, for instance the octyl, decyl, undecyl, dodecyl, tridecyl, tetradecyl, pentadecyl, hexadecyl, heptadecyl, octadecyl, nonadecyl or eicosyl radical;

or a radical derived from Guerbet alcohols, which are branched 1-alkanols corresponding to the general formula:

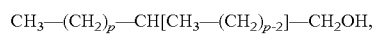

in which p represents an integer between 2 and 9, for instance 2-ethylhexyl, 2-propylheptyl, 2-butyloctyl, 2-pentylnonyl, 2-hexyldecyl or 2-octyldodecyl radicals;

or a radical derived from isoalkanols corresponding to the general formula:

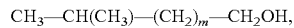

in which m represents an integer between 2 and 16, for instance 4-methylpentyl, 5-methylhexyl, 6-methylheptyl, 15-methylpentadecyl or 16-methylheptadecyl radicals, or 2-hexyloctyl, 2-octyldecyl or 2-hexyldodecyl radicals;

in formula (VI), R represents an alkyl radical including from 12 to 18 carbon atoms;

in formula (VI), R represents an alkyl radical chosen from the elements of the group consisting of the dodecyl, tridecyl, tetradecyl, hexadecyl and octadecyl radicals;

in formula (VI), n represents an integer greater than or equal to 3 and less than or equal to 20;

said monomer of formula (VI) is tetraethoxylated lauryl methacrylate;

said monomer of formula (VI) is eicosaethoxylated stearyl methacrylate;

said crosslinking monomer (AR) is used in a molar proportion of less than or equal to 0.5%, more particularly less than or equal to 0.25% and most particularly less than or equal to 0.1%; it is more particularly greater than or equal to 0.005 mol %;

said crosslinked cationic polyelectrolyte (CP) is chosen from terpolymers of N,N,N-trimethyl-3-[(1-oxo-2-propenyl)amine]propanammonium chloride (APTAC), of 2-hydroxyethyl acrylate and of tetraethoxylated lauryl methacrylate crosslinked with trimethylolpropane triacrylate or terpolymers of N,N,N-trimethyl-3-[(1-oxo-2-propenyl)amino]propanammonium chloride (APTAC), of 2-hydroxyethyl acrylate and of eicosaethoxylated stearyl methacrylate crosslinked with trimethylolpropane triacrylate;

the crosslinked cationic polyelectrolyte (CP) is a terpolymer of N,N,N-trimethyl-3-[(1-oxo-2-propenyl)amino]propanammonium chloride (APTAC), of 2-hydroxyethyl acrylate and of tetraethoxylated lauryl methacrylate crosslinked with trimethylolpropane triacrylate or with ethylene glycol dimethacrylate or with ethylene glycol diacrylate;

said crosslinked cationic polyelectrolyte (CP) includes, per 100 mol %:
from 45 mol % to 60 mol % of monomer units derived from N,N,N-trimethyl-3-[(1-oxo-2-propenyl)amino]propanammonium chloride
from 0.5 mol % to 3 mol % of monomer units derived from tetraethoxylated lauryl methacrylate, and
from 37 mol % to 54.5 mol % of monomer units derived from 2-hydroxyethyl acrylate said emulsifying system (S) consists of an alkylpolyglycoside composition (C2) represented by formula (VII):

$$R_1-O-(G)_x-H \tag{VII}$$

in which x represents a decimal number between 1.05 and 2.5, G represents a xylose residue, and $R_1$ represents a 2-octyldodecyl radical, said composition $(C_1)$ consisting of a mixture of compounds represented by formulae $(VII_1)$, $(VII_2)$, $(VII_3)$, $(VII_4)$ and $(VII_5)$:

$$R_1-O-(G)_1-H \tag{VII_1}$$
$$R_1-O-(G)_2-H \tag{VII_2}$$
$$R_1-O-(G)_3-H \tag{VII_3}$$
$$R_1-O-(G)_4-H \tag{VII_4}$$
$$R_1-O-(G)_5-H \tag{VII_5}$$

in the respective molar proportions $a_1$, $a_2$, $a_3$, $a_4$ and $a_5$, such that:
the sum $a_1+a_2+a_3+a_4+a_5$ is equal to 1, and that
the sum $a_1+2a_2+3a_3+4a_4+5a_5$ is equal to x;

said emulsifying system (S) consists of a composition (C3) comprising, per 100% of its mass:
from 10% to 50% by mass of at least one alkylpolyglycoside composition (C2) represented by formula (VII):

$$R_1-O-(G)_x-H \tag{VII}$$

in which x represents a decimal number between 1.05 and 2.5, G represents a xylose residue, and $R_1$ represents a 2-octyldodecyl radical, said composition consisting of a mixture of compounds represented by formulae $(VII_1)$, $(VII_2)$, $(VII_3)$, $(VII_4)$ and $(VII_5)$:

$$R_1-O-(G)_1-H \tag{VII_1}$$
$$R_1-O-(G)_2-H \tag{VII_2}$$
$$R_1-O-(G)_3-H \tag{VII_3}$$
$$R_1-O-(G)_4-H \tag{VII_4}$$
$$R_1-O-(G)_5-H \tag{VII_5}$$

in the respective molar proportions $a_1$, $a_2$, $a_3$, $a_4$ and $a_5$, such that:
the sum $a_1+a_2+a_3+a_4+a_5$ is equal to 1, and that
the sum $a_1+2a_2+3a_3+4a_4+5a_5$ is equal to x; and
from 90% to 50% by mass of at least one fatty alcohol of formula (VIII):

$$R'_1-OH \tag{VIII}$$

in which $R'_1$ represents a 2-octyldodecyl radical;
said emulsifying system (S) consists of a composition (C4) comprising, per 100% of its mass:
from 15% to 25% by mass of at least one composition (C2) represented by formula (VII):

$$R_1-O-(G)_x-H \tag{VII}$$

in which x represents a decimal number between 1.05 and 2.5, G represents a xylose residue, and R1 represents a 2-octyldodecyl radical, said composition $(C_1)$ consisting of a mixture of compounds represented by formulae $(VII_1)$, $(VII_2)$, $(VII_3)$, $(VII_4)$ and $(VII_5)$:

$$R_1-O-(G)_1-H \tag{VII_1}$$
$$R_1-O-(G)_2-H \tag{VII_2}$$
$$R_1-O-(G)_3-H \tag{VII_3}$$
$$R_1-O-(G)_4-H \tag{VII_4}$$
$$R_1-O-(G)_5-H \tag{VII_5}$$

in the respective molar proportions $a_1$, $a_2$, $a_3$, $a_4$ and $a_5$, such that:
the sum $a_1+a_2+a_3+a_4+a_5$ is equal to 1, and that
the sum $a_1+2a_2+3a_3+4a_4+5a_5$ is equal to x;
from 55% to 65% by mass of at least one fatty alcohol of formula (VIII):

$$R'_1-OH \tag{VIII}$$

in which represents a 2-octyldodecyl radical;
from 10% to 30% by mass of at least one polyglycol polyhydroxystearate represented by formula (XI):

$$Z_2-O-\left[\begin{array}{c}O\\|\\R_4\end{array}\right]_{y_2}-O-Z'_2 \tag{XI}$$

in which $y_2$ represents an integer greater than or equal to 2 and less than or equal to 50, $R_4$ represents a hydrogen atom, a methyl radical or an ethyl radical, and $Z_2$ represents a radical of formula (XII):

(XII)

in which y'$_2$ represents an integer greater than or equal to 0 and less than or equal to 10, more particularly greater than or equal to 1 and less than or equal to 10, and Z'$_2$ represents a radical of formula (XII) as defined above, where Z$_2$' may be identical to or different from Z$_2$, or a hydrogen atom.

The term "at least one diethylenic or polyethylenic crosslinking monomer (AR)" notably denotes, in the definition of said crosslinked cationic polyelectrolyte (CP), a monomer chosen from the elements of the group consisting of methylenebis(acrylamide), ethylene glycol dimethacrylate, diethylene glycol diacrylate, ethylene glycol diacrylate, diallylurea, triallylamine, trimethylolpropane triacrylate, diallyloxyacetic acid or a salt thereof, such as sodium diallyloxyacetate, or a mixture of these compounds; and more particularly a monomer chosen from ethylene glycol dimethacrylate, triallylamine, trimethylolpropane triacrylate or methylenebis(acrylamide) or a mixture of these compounds.

The crosslinked cationic polyelectrolyte (CP) used in the cosmetic composition (C1) which is a subject of the present invention may be prepared by performing a radical polymerization process known to those skilled in the art, for instance processes of solution polymerization, suspension polymerization, inverse suspension polymerization, emulsion polymerization, inverse emulsion polymerization or polymerization in solvent medium followed by a step of precipitation of the polymer formed.

According to a more particular aspect, the crosslinked cationic polyelectrolyte (CP) used in the cosmetic composition (C1) which is a subject of the present invention may be prepared by performing a process of polymerization in solvent medium followed by a step of precipitation of the polymer formed, or of inverse emulsion polymerization optionally followed by a step of concentration and/or atomization.

According to a more particular aspect, the crosslinked cationic polyelectrolyte (CP) used in the cosmetic composition (C1) which is a subject of the present invention may be prepared according to one of the processes described above and may involve the use of transfer agents or chain-limiting agents. The transfer agents or chain-limiting agents are more particularly chosen from the group consisting of sodium hypophosphite, alcohols of low molecular weight, for example methanol, ethanol, 1-propanol, isopropanol or butanol, thiols, for example 2-mercaptoethanol, transfer agents comprising a sulfate function, for example sodium methallylsulfonate, or mixtures of said transfer agents. The transfer agents or chain-limiting agents are more particularly used in molar proportions, expressed relative to the total number of moles of monomers used, of from 0.001 mol % to 1 mol %, more particularly from 0.001 mol % to 0.5 mol %, and most particularly from 0.001 mol % to 0.1 mol %.

In the definition of the cosmetic composition (C1) which is a subject of the present invention, the term "alkylpolyglycoside composition" denotes a composition (C2) represented by formula (VII):

$$R_1\text{—}O\text{-}(G)_x\text{-}H \tag{VII}$$

in which x represents a decimal number between 1.05 and 5, G represents a reducing sugar residue, and R$_1$ represents a saturated or unsaturated, linear or branched aliphatic hydrocarbon-based radical, optionally substituted with one or more hydroxyl groups, including from 12 to 36 carbon atoms, said composition (C2) consisting of a mixture of compounds represented by formulae (VII$_1$), (VII$_2$), (VII$_3$), (VII$_4$) and (VII$_5$):

$$R_1\text{—}O\text{-}(G)_1\text{-}H \tag{VII$_1$}$$

$$R_1\text{—}O\text{-}(G)_2\text{-}H \tag{VII$_2$}$$

$$R_1\text{—}O\text{-}(G)_3\text{-}H \tag{VII$_3$}$$

$$R_1\text{—}O\text{-}(G)_4\text{-}H \tag{VII$_4$}$$

$$R_1\text{—}O\text{-}(G)_5\text{-}H \tag{VII$_5$}$$

in the respective molar proportions a$_1$, a$_2$, a$_3$, a$_4$ and a$_5$, such that:
the sum a$_1$+a$_2$+a$_3$+a$_4$+a$_5$ is equal to 1, and that
the sum a$_1$+2a$_2$+3a$_3$+4a$_4$+5a$_5$ is equal to x.

The term "saturated or unsaturated, linear or branched aliphatic hydrocarbon-based radical including from 12 to 36 carbon atoms, optionally substituted with one or more hydroxyl groups" denotes, for the radical R$_1$ in formula (VII) as defined above:
saturated linear alkyl radicals, for example n-dodecyl, n-tridecyl, n-tetradecyl, n-pentadecyl, n-hexadecyl, n-heptadecyl, n-octadecyl, n-nonadecyl, n-eicosyl, n-docosyl radicals;
unsaturated linear radicals such as dodecenyl, tridecenyl, tetradecenyl, pentadecenyl, hexadecenyl, heptadecenyl, octadecenyl, nonadecenyl, eicosenyl, docosenyl, 4-dodecenyl or 5-dodecenyl radicals;
saturated or unsaturated, linear or branched aliphatic radicals including from 12 to 36 carbon atoms, substituted with one or two hydroxyl groups, such as hydroxydodecyl, hydroxytetradecyl, hydroxyhexadecyl, hydroxyoctadecyl, hydroxyeicosyl or hydroxydocosyl radicals, for example the 12-hydroxyoctadecyl radical;
radicals derived from isoalkanols of formula (1):

$$(CH_3)(CH_3)CH\text{—}(CH_2)_r\text{—}CH_2\text{—}OH \tag{1}$$

in which r represents an integer between 8 and 20, for example isodecyl, isoundecyl, isododecyl, isotridecyl, isotetradecyl, isopentadecyl, isohexadecyl, isopentadecyl, isooctadecyl, isononadecyl, isoeicosyl or isodocosyl radicals;
branched alkyl radicals, derived from Guerbet alcohols, of formula (2):

$$CH(C_sH_{2s+1})(C_tH_{2t+1})\text{—}CH_2\text{—}OH \tag{2}$$

in which t is an integer between 6 and 18, s is an integer between 4 and 18 and the sum s+t is greater than or equal to 10 and less than or equal to 22, for example 2-butyloctyl, 2-butyldecyl, 2-hexyloctyl, 2-hexyldecyl, 2-octyldecyl, 2-hexyldodecyl, 2-octyldodecyl, 2-decyltetradecyl, 2-dodecylhexadecyl and 2-tetradecyloctadecyl radicals.

According to a particular aspect, in the definition of formula (VII) as defined above, R$_1$ represents a saturated or unsaturated, linear or branched aliphatic hydrocarbon-based radical including from 12 to 24 carbon atoms.

The term "reducing sugar" in the definition of formula (VII) as defined above denotes saccharide derivatives that do not have in their structures any glycoside bonds established between an anomeric carbon and the oxygen of an acetal group as defined in the reference publication: "Biochemistry", Daniel Voet/Judith G. Voet, page 250, John Wiley & Sons, 1990. The oligomeric structure (G)$_x$ may be in any isomeric form, whether it is optical isomerism, geometrical isomerism or regioisomerism; it may also represent a mixture of isomers.

In formula (VII) as defined above, the group $R_1$—O— is linked to G via the anomeric carbon of the saccharide residue, so as to form an acetal function.

According to a particular aspect in the definition of formula (VII) as defined above, G represents a reducing sugar residue chosen from glucose, dextrose, sucrose, fructose, idose, gulose, galactose, maltose, isomaltose, maltotriose, lactose, cellobiose, mannose, ribose, xylose, arabinose, lyxose, allose, altrose, dextran and tallose; and more particularly G represents a reducing sugar residue chosen from glucose, xylose and arabinose residues.

According to an even more particular aspect, in the definition of formula (VII) representing composition (C2) included in the cosmetic composition (C1) which is a subject of the present invention, x represents a decimal number greater than or equal to 1.05 and less than or equal to 2.5, more particularly greater than or equal to 1.05 and less than or equal to 2.0 and even more particularly greater than or equal to 1.25 and less than or equal to 2.0.

According to an even more particular aspect, in the definition of formula (VII) as defined above, $R_1$ represents the radical chosen from at least one of the elements of the group consisting of n-dodecyl, n-tetradecyl, n-hexadecyl, n-octadecyl, n-eicosyl, n-docosyl, 2-hexyldecyl, 2-octyldecyl, 2-hexyldodecyl, 2-octyldodecyl and 2-decyltetradecyl radicals; G represents a reducing sugar residue chosen from glucose and xylose residues and x represents a decimal number greater than or equal to 1.05 and less than or equal to 2.5.

In the definition of the cosmetic composition (C1) which is a subject of the present invention, the term "alkylpolyglycoside and fatty alcohol composition" denotes a composition (C3) comprising, per 100% of its mass:
  from 10% to 50% by mass, more particularly from 15% to 40% by mass and even more particularly from 20% to 30% by mass of at least one composition (C2) represented by formula (II) as defined previously,
  from 90% to 50% by mass, more particularly from 85% to 60% by mass and even more particularly from 80% to 70% by mass of at least one fatty alcohol of formula (VIII):

$$R'_1\text{—OH} \qquad (VIII),$$

in which $R'_1$, which may be identical to or different from $R_1$, represents a saturated or unsaturated, linear or branched aliphatic hydrocarbon-based radical, optionally substituted with one or more hydroxyl groups, including from 12 to 36 carbon atoms.

According to a particular aspect, in the definition of formula (VII) representing composition (C2) included in composition (C3), $R_1$ represents the radical chosen from n-dodecyl, n-tetradecyl, n-hexadecyl, n-octadecyl, n-eicosyl, n-docosyl, 2-hexyldecyl, 2-octyldecyl, 2-hexyldodecyl, 2-octyldodecyl and 2-decyltetradecyl radicals, G represents a reducing sugar residue chosen from glucose and xylose residues and x represents a decimal number greater than or equal to 1.05 and less than or equal to 2.5.

According to a more particular aspect, in the definition of formula (II) representing composition (C2) included in composition (C3), $R_1$ represents a 2-octyldodecyl radical, G represents a xylose residue and x represents a decimal number greater than or equal to 1.05 and less than or equal to 2.5.

According to a more particular aspect, in the definition of the fatty alcohol of formula (VIII) as defined above, $R'_1$ represents a radical chosen from n-dodecyl, n-tetradecyl, n-hexadecyl, n-octadecyl, n-eicosyl, n-docosyl, 2-hexyldecyl, 2-octyldecyl, 2-hexyldodecyl, 2-octyldodecyl and 2-decyltetradecyl radicals, $R'_1$ most particularly represents a 2-octyldodecyl radical.

In the definition of the cosmetic composition (C1) which is a subject of the present invention, the term "polyglycerol ester" denotes a compound of formula (IX):

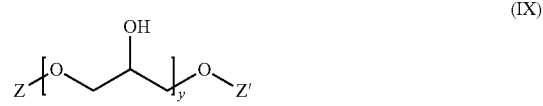

(IX)

in which Z represents an acyl radical of formula $R_2$—C(=O)—, in which $R_2$ represents a saturated or unsaturated, linear or branched aliphatic hydrocarbon-based radical, including from 11 to 35 carbon atoms and more particularly a radical chosen from dodecanoyl, tetradecanoyl, hexadecanoyl, octadecanoyl, eicosanoyl, docosanoyl, oleyl, linoleyl, linolenoyl and isostearyl radicals, Z' represents the acyl radical of formula $R_2$—C(=O)— as defined above, with Z', which may be identical to or different from Z, or a hydrogen atom, and y represents an integer greater than or equal to 2 and less than or equal to 20.

According to a more particular aspect, the compound of formula (IX) is chosen from the elements of the group consisting of decaglyceryl oleate, decaglyceryl isostearate, decaglyceryl monolaurate, decaglyceryl monolinoleate and decaglyceryl monomyristate.

In the definition of the cosmetic composition (C1) which is a subject of the present invention, the term "alkoxylated polyglycerol ester" denotes a compound of formula (X):

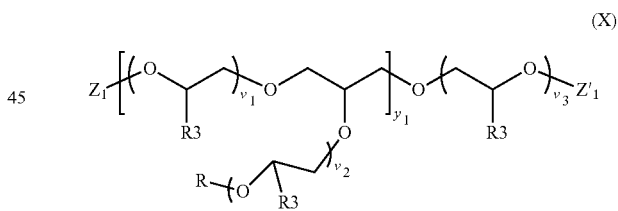

(X)

in which $Z_1$ represents an acyl radical of formula $R'_2$—C(=O)—, in which $R'_2$ represents a saturated or unsaturated, linear or branched aliphatic hydrocarbon-based radical, including from 11 to 35 carbon atoms, and more particularly a radical chosen from dodecanoyl, tetradecanoyl, hexadecanoyl, octadecanoyl, eicosanoyl, docosanoyl, oleyl, linoleyl, linolenoyl and isostearyl radicals, $Z_1'$ represents the acyl radical of formula $R'_2$—C(=O)— as defined above, with $Z_1'$, which may be identical to or different from $Z_1$, or a hydrogen atom, $R_3$ represents a hydrogen atom, a methyl radical or an ethyl radical, $y_1$ represents an integer greater than or equal to 2 and less than or equal to 20, $v_1$, $v_2$ and $v_3$, which may be identical or different, represent an integer greater than or equal to 0 and less than or equal to 50, and the sum $[(y_1 \cdot v_1)+(y_1 \cdot v_2)+v_3]$ is an integer greater than or equal to 1 and less than or equal to 50.

In the definition of the cosmetic composition (C1) which is a subject of the present invention, the term "polyglycol polyhydroxystearate" denotes a compound of formula (XI):

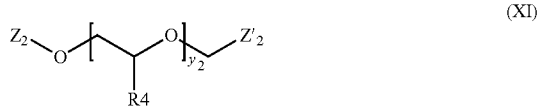

(XI)

in which $y_2$ represents an integer greater than or equal to 2 and less than or equal to 50, $R_4$ represents a hydrogen atom, a methyl radical or an ethyl radical, and $Z_2$ represents a radical of formula (XII):

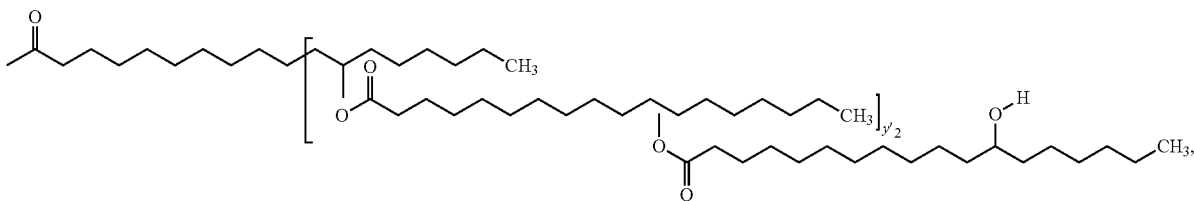

(VII)

in which $y'_2$ represents an integer greater than or equal to 0 and less than or equal to 10, more particularly greater than or equal to 1 and less than or equal to 10 and $Z'_2$ represents a radical of formula (XII) as defined above, with $Z_2{}'$ which may be identical to or different from $Z_2$, or a hydrogen atom.

In the definition of the cosmetic composition (C1) which is a subject of the present invention, the term "polyglyceryl polyhydroxystearate" denotes a compound represented by formula (XIII):

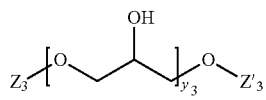

(XIII)

in which $Z_3$ represents a radical of formula (XII) as defined above, $Z'_3$ represents a radical of formula (XII) as defined above, with $Z_3{}'$ which may be identical to or different from $Z_3$, or a hydrogen atom, $y_3$ represents an integer greater than or equal to 2 and less than or equal to 20.

In the definition of the cosmetic composition (C1) which is a subject of the present invention, the term "alkoxylated polyglyceryl polyhydroxystearate" denotes a compound represented by formula (XIV):

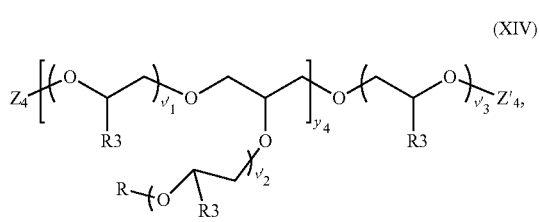

(XIV)

in which $Z_4$ represents a radical of formula (XII) as defined above, $Z'_4$ represents a radical of formula (XII) as defined above, with $Z_4{}'$ which may be identical to or different from $Z_4$, or a hydrogen atom, $y_4$ represents an integer greater than or equal to 2 and less than or equal to 20, $v'_1$, $v'_2$ and $v'_3$, which may be identical or different, represent an integer greater than or equal to 0 and less than or equal to 50, and the sum $[(y_4 \cdot v'_1)+(y_4 \cdot v'_2)+v'_3)]$ is an integer greater than or equal to 1 and less than or equal to 50.

In the definition of the cosmetic composition (C1) which is a subject of the present invention, the term "polyethylene glycol-alkylglycol copolymer" denotes a compound represented by formula (XV):

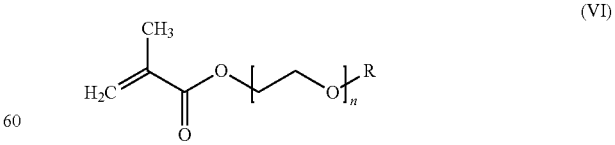

(XV)

in which $w_1$ and $w'_1$, which may be identical or different, represent an integer greater than or equal to 1 and less than or equal to 50, more particularly greater than or equal to 1 and less than or equal to 25, $w_2$ represents an integer greater than or equal to 1 and less than or equal to 100, more particularly greater than or equal to 1 and less than or equal to 50.

A subject of the present invention is also a crosslinked cationic polyelectrolyte (CP1) comprising, per 100 mol %:

b1) from 40 mol % to 60 mol % and even more particularly from 45 mol % to 60 mol % of cationic monomer units derived from an element from the group consisting of 2,N,N,N-tetramethyl-2-[(1-oxo-2-propenyl)amino]propanammonium chloride (AMPTAC), 2,N,N-trimethyl-2-[(1-oxo-2-propenyl)amino]propanammonium chloride and N,N,N-trimethyl-3-[(1-oxo-2-propenyl)amino] propanammonium chloride (APTAC), b2) from 0.1 mol % to 3 mol % and even more particularly from 0.5 mol % to 3 mol % of monomer units derived from at least one monomer of formula (VI):

(VI)

in which R represents a linear or branched alkyl radical including from 8 to 20 carbon atoms and n represents an integer greater than or equal to 0 and less than or equal to 20;

b3) from 37 mol % to 59.9 mol % and even more particularly from 37 mol % to 54.5 mol % of monomer units derived from at least one neutral monomer chosen from the elements of the group consisting of acrylamide, N,N-dimethylacrylamide; methacrylamide or N-isopropylacrylamide, 2-hydroxyethyl acrylate or 2-hydroxyethyl methacrylate;

b4) a proportion of greater than 0 mol % and less than or equal to 1 mol % of monomer units derived from at least one diethylenic or polyethylenic crosslinking monomer (AR);

the sum of said molar proportions of monomer units according to b1), b2), b3) and b4) being equal to 100 mol %.

Depending on the case, the crosslinked cationic polyelectrolyte (CP1) according to the invention may have one or more of the following features:

the crosslinked cationic polyelectrolyte (CP1) is a crosslinked cationic polyelectrolyte (CP1) for which the cationic monomer units are derived from N,N,N-trimethyl-3-[(1-oxo-2-propenyl)amino]propanammonium chloride (APTAC), the crosslinked cationic polyelectrolyte (CP1) is a crosslinked cationic polyelectrolyte (CP1) for which the monomer units derived from a neutral monomer are chosen from 2-hydroxyethyl acrylate or 2-hydroxyethyl methacrylate. Preferably, the neutral monomer is 2-hydroxyethyl acrylate.

the crosslinked cationic polyelectrolyte (CP1) is a crosslinked cationic polyelectrolyte (CP1) for which, in said monomer of formula (VI), R represents an alkyl radical including from 12 to 18 carbon atoms, and even more particularly R represents an alkyl radical chosen from the elements of the group consisting of dodecyl, tridecyl, tetradecyl, hexadecyl and octadecyl radicals, the crosslinked cationic polyelectrolyte (CP1) is a crosslinked cationic polyelectrolyte (CP1) for which, in said monomer of formula (VI), n represents an integer greater than or equal to 3 and less than or equal to 20, the crosslinked cationic polyelectrolyte (CP1) is a crosslinked cationic polyelectrolyte (CP1) for which said monomer of formula (VI) is tetraethoxylated lauryl methacrylate or eicosaethoxylated stearyl methacrylate, the crosslinked cationic polyelectrolyte (CP1) is chosen from terpolymers of N,N,N-trimethyl-3-[(1-oxo-2-propenyl)amine]propanammonium chloride (APTAC), of 2-hydroxyethyl acrylate and of tetraethoxylated lauryl methacrylate crosslinked with trimethylolpropane triacrylate or terpolymers of N,N,N-trimethyl-3-[(1-oxo-2-propenyl)amino]propanammonium chloride (APTAC), of 2-hydroxyethyl acrylate and of eicosaethoxylated stearyl methacrylate crosslinked with trimethylolpropane triacrylate or with ethylene glycol dimethacrylate or with ethylene glycol diacrylate, the crosslinked cationic polyelectrolyte (CP) is a terpolymer of N,N,N-trimethyl-3-[(1-oxo-2-propenyl)amino]propanammonium chloride (APTAC), of 2-hydroxyethyl acrylate and of tetraethoxylated lauryl methacrylate crosslinked with trimethylolpropane triacrylate or with ethylene glycol dimethacrylate or with ethylene glycol diacrylate, the crosslinked cationic polyelectrolyte (CP1) includes, per 100 mol %:
from 45 mol % to 60 mol % of monomer units derived from N,N,N-trimethyl-3-[(1-oxo-2-propenyl)amino] propanammonium chloride
from 0.1 mol % to 3 mol % of monomer units derived from tetraethoxylated lauryl methacrylate, and
from 35 mol % to 54.5 mol % of monomer units derived from 2-hydroxyethyl acrylate.

The crosslinked cationic polyelectrolyte (CP1) that is a subject of the present invention is prepared by performing processes of solution polymerization, suspension polymerization, inverse suspension polymerization, emulsion polymerization, inverse emulsion polymerization, polymerization in solvent medium followed by a step of precipitating the polymer formed, as described previously for the preparation of the crosslinked cationic polyelectrolyte (CP).

A subject of the invention is also the use of the composition (C1) as defined previously for improving the combing of locks of hair.

According to a more particular aspect, a subject of the invention is the use of the composition (C1) as defined previously for improving the combing of the ends of hair strands.

The composition (C1) that is a subject of the present invention as defined previously is intended to be applied to the hair and/or the scalp directly or indirectly, for instance via any type of support intended to be placed in contact with the skin (paper, wipe, textile, transdermal device, etc.). This step of applying the composition (C1) according to the invention takes place after at least one step of washing said hair and is followed by at least one rinsing step; this step of applying the composition (C1) according to the invention is followed by another step of rinsing, and optionally of drying the hair thus washed, treated and rinsed.

The composition (C1) which is a subject of the present invention may be packaged in pressurized form in an aerosol device or in a device of "pump-bottle" type, in a device equipped with a perforated wall, for example a grille, or in a device equipped with a ball applicator (known as a "roll-on").

The composition (C1) that is a subject of the present invention may also include excipients and/or active principles commonly used in the field of formulations intended to be applied to the hair or the scalp.

The composition (C1) as defined previously also comprises one or more auxiliary compounds chosen from foaming and/or detergent surfactants, thickening and/or gelling surfactants, thickening and/or gelling agents, stabilizers, film-forming compounds, solvents and cosolvents, hydrotropic agents, plasticizers, emulsifiers and co-emulsifiers, opacifiers, nacreous agents, superfatting agents, sequestrants, chelating agents, antioxidants, fragrances, essential oils, preserving agents, conditioning agents, deodorants, bleaching agents intended for bleaching bodily hair and the skin, active principles intended to provide a treating and/or protective action to the skin or the hair, sunscreens, mineral fillers or pigments, particles that give a visual effect or that are intended for encapsulating active agents, exfoliant particles, texturing agents, optical brighteners and insect repellents.

As examples of foaming and/or detergent surfactants that may be present in the cosmetic composition (C1) which is a subject of the present invention, mention may be made of topically acceptable anionic, cationic, amphoteric or nonionic foaming and/or detergent surfactants commonly used in this field of activity.

Among the foaming and/or detergent anionic surfactants that may be combined with the cosmetic composition (C1) that is a subject of the present invention, mention may be made of alkali metal salts, alkaline-earth metal salts, ammonium salts, amine salts or amino alcohol salts of alkyl ether sulfates, of alkyl sulfates, of alkylamido ether sulfates, of alkylarylpolyether sulfates, of monoglyceride sulfates, of α-olefin sulfonates, of paraffin sulfonates, of alkyl phosphates, of alkyl ether phosphates, of alkyl sulfonates, of alkylamide sulfonates, of alkylaryl sulfonates, of alkyl carboxylates, of alkylsulfosuccinates, of alkyl ether sulfosuccinates, of alkylamide sulfosuccinates, of alkyl sulfoacetates, of alkyl sarcosinates, of acylisethionates, of N-acyl taurates, of acyl lactylates, of N-acylamino acid derivatives, of N-acyl peptide derivatives, of N-acyl protein derivatives or of fatty acids.

Among the foaming and/or detergent amphoteric surfactants that may be present in the cosmetic composition (C1) which is a subject of the present invention, mention may be made of alkylbetaines, alkylamidobetaines, sultaines, alkylamidoalkylsulfobetaines, imidazoline derivatives, phosphobetaines, amphopolyacetates and amphopropionates.

Among the foaming and/or detergent cationic surfactants that may be present in the cosmetic composition (C1) which is a subject of the present invention, mention may be made particularly of quaternary ammonium derivatives.

Among the foaming and/or detergent nonionic surfactants that may be present in the cosmetic composition (C1) which is a subject of the present invention, mention may be made more particularly of alkylpolyglycosides including a linear or branched, saturated or unsaturated aliphatic radical and including from 8 to 12 carbon atoms; castor oil derivatives, polysorbates, coconut kernel amides and N-alkylamines.

As examples of thickening and/or gelling surfactants that may be present in the cosmetic composition (C1) which is a subject of the present invention, mention may be made of:
  optionally alkoxylated fatty esters of alkylpolyglycosides, and most particularly ethoxylated esters of methylpolyglucoside such as PEG 120 methyl glucose trioleate and PEG 120 methyl glucose dioleate sold, respectively, under the names Glucamate™ LT and Glumate™ DOE120;
  alkoxylated fatty esters such as the PEG 150 pentaerythrityl tetrastearate sold under the name Crothix™ DS53, or PEG 55 propylene glycol oleate sold under the name Antil™ 141;
  fatty-chain polyalkylene glycol carbamates such as PPG 14 laureth isophoryl dicarbamate sold under the name Elfacos™ 1211, or PPG 14 palmeth 60 hexyl dicarbamate sold under the name Elfacos™ GT2125.

As examples of emulsifying surfactants that may be present in the cosmetic composition (C1) which is a subject of the present invention, mention may be made of nonionic surfactants, anionic surfactants and cationic surfactants.

As examples of emulsifying nonionic surfactants that may be present in the cosmetic composition (C1) which is a subject of the present invention, mention may be made of fatty acid esters of sorbitol, for example the products sold under the names Montane™ 80 and Montane™ 85 and Montane™ 60; ethoxylated castor oil and ethoxylated hydrogenated castor oil, for example the product sold under the name Simulsol™ 989; compositions comprising glyceryl stearate and stearic acid poly(ethoxylated) with between 5 mol and 150 mol of ethylene oxide, for example the composition comprising stearic acid (ethoxylated) with 135 mol of ethylene oxide and glyceryl stearate sold under the name Simulsol™ 165; ethoxylated sorbitan esters, for example the products sold under the name Montanox™; mannitan esters; ethoxylated mannitan esters; sucrose esters; methylglucoside esters.

As examples of emulsifying anionic surfactants that may be present in the cosmetic composition (C1) which is a subject of the present invention, mention may be made of decyl phosphate, cetyl phosphate sold under the name Amphisol™, glyceryl stearate citrate; cetearyl sulfate; the arachidyl/behenyl phosphates and arachidyl/behenyl alcohols composition sold under the name Sensanov™ WR; soaps, for example sodium stearate or triethanolammonium stearate, or N-acylated derivatives of amino acids which are salified, for instance stearoyl glutamate.

As examples of emulsifying cationic surfactants that may be present in the cosmetic composition (C1) which is a subject of the present invention, mention may be made of amine oxides, quaternium-82 and the surfactants described in patent application WO 96/00719 and mainly those in which the fatty chain comprises at least 16 carbon atoms.

As examples of opacifiers and/or nacreous agents that may be present in the cosmetic composition (C1) which is a subject of the present invention, mention may be made of sodium palmitate, sodium stearate, sodium hydroxystearate, magnesium palmitate, magnesium stearate, magnesium hydroxystearate, ethylene glycol monostearate, ethylene glycol distearate, polyethylene glycol monostearate, polyethylene glycol distearate and fatty alcohols including from 12 to 22 carbon atoms.

As examples of texturing agents that may be present in the cosmetic composition (C1) which is a subject of the present invention, mention may be made of N-acylamino acid derivatives, for example lauroyl lysine sold under the name Aminohope™ LL, octenyl starch succinate sold under the name Dryflo™, myristyl polyglucoside sold under the name Montanov 14, cellulose fibers, cotton fibers, chitosan fibers, talc, sericite and mica.

As examples of solvents and cosolvents that may be present in the cosmetic composition (C1) which is a subject of the present invention, mention may be made of water, organic solvents, for example glycerol, diglycerol, glycerol oligomers, ethylene glycol, propylene glycol, butylene glycol, hexylene glycol, diethylene glycol, xylitol, erythritol, sorbitol, water-soluble alcohols such as ethanol, isopropanol or butanol, and mixtures of water and of said organic solvents.

Examples of active principles that may be present in the cosmetic composition (C1) which is a subject of the present invention include:
  vitamins and derivatives thereof, for example retinol (vitamin A) and esters thereof (for example retinyl palmitate), ascorbic acid (vitamin C) and esters thereof, sugar derivatives of ascorbic acid (for example ascorbyl glucoside), tocopherol (vitamin E) and esters thereof (for example tocopheryl acetate), vitamins B3 or B10 (niacinamide and derivatives thereof);
  compounds with a lightening or depigmenting action on the skin, for example Sepiwhite™ MSH, arbutin, kojic acid, hydroquinone, Vegewhite™, Gatuline™, Synerlight™, Biowhite™, Phytolight™, Dermalight™, Clariskin™, Melaslow™, Dermawhite™, Ethioline, Melarest™, Gigawhite™, Albatine™ and Lumiskin™;
  compounds with a calmative action, such as Sepicalm™ S, allantoin and bisabolol;
  anti-inflammatory agents;
  compounds showing a moisturizing action, for example urea, hydroxyureas, glycerol, polyglycerols, glyceryl glucoside, diglyceryl glucoside and polyglyceryl glucosides;
  compounds showing a slimming or lipolytic action, such as caffeine or derivatives thereof, Adiposlim™ and Adiposless™;
  N-acyl proteins; N-acyl peptides, for example Matrixil™; N-acyl amino acids; partial hydrolyzates of N-acyl proteins; amino acids; peptides; total protein hydrolyzates;
  plant extracts rich in tannins, polyphenols and/or isoflavones, for example grape extracts, pine extracts, wine extracts, olive extracts; soybean extracts, for example Raffermine™; wheat extracts, for example Tensine™ or Gliadine™; terpene-rich plant extracts; freshwater or seawater algal extracts; marine extracts in general such as corals;

essential waxes; bacterial extracts; ceramides or phospholipids;

compounds with antimicrobial action or with purifying action, for example Lipacide™ C8G, Lipacide™ UG, Sepicontrol™ A5; Octopirox™ or Sensiva™ SC50;

compounds with an energizing or stimulating property, such as Physiogenyl™ panthenol and derivatives thereof such as Sepicap™ MP;

antiaging active agents such as Sepilift™ DPHP, Lipacide™ PVB, Sepivinol™, Sepivital™ Manoliva™, Phyto-Age™, Timecode™ or Survicode™;

anti-photoaging active agents; active agents for protecting the integrity of the dermo-epidermal junction;

active agents which increase the synthesis of extracellular matrix components, for example collagen, elastins and glycosaminoglycans;

active agents acting favorably on chemical cellular communication, such as cytokines, or on physical cellular communication, such as integrins;

active agents which create a "heating" sensation on the skin, such as skin microcirculation activators (for example nicotinic acid derivatives) or products which create a "freshness" sensation on the skin (for example menthol and derivatives thereof);

active agents which improve the skin microcirculation, for example venotonic agents; draining active agents; decongesting active agents, for example extracts of *Ginkgo biloba*, ivy, common horse chestnut, bamboo, ruscus, butcher's-broom, *Centella asiatica*, fucus, rosemary or willow;

skin tanning or browning agents, for example dihydroxyacetone, isatin, alloxan, ninhydrin, glyceraldehyde, mesotartaric aldehyde, glutaraldehyde or erythrulose.

As examples of thickening and/or gelling agents that may be present in the cosmetic composition (C1) according to the invention, mention may be made of polysaccharides consisting only of monosaccharides, such as glucans or glucose homopolymers, glucomannoglucans, xyloglycans, galactomannans of which the degree of substitution (DS) of the D-galactose units on the main D-mannose chain is between 0 and 1, and more particularly between 1 and 0.25, such as galactomannans originating from cassia gum (DS=⅕), locust bean gum (DS=¼), tara gum (DS=⅓), guar gum (DS=½) or fenugreek gum (DS=1).

As examples of thickening and/or gelling agents that may be present in the cosmetic composition (C1) according to the invention, mention may be made of polysaccharides consisting of monosaccharide derivatives, such as sulfated galactans and more particularly carrageenans and agar, uronans and more particularly algins, alginates and pectins, heteropolymers of monosaccharides and uronic acids, and more particularly xanthan gum, gellan gum, gum arabic exudates and karaya gum exudates, and glucosaminoglycans.

As examples of thickening and/or gelling agents that may be present in the cosmetic composition (C1) according to the invention, mention may be made of cellulose, cellulose derivatives such as methyl cellulose, ethyl cellulose, hydroxypropyl cellulose, silicates, starch, hydrophilic starch derivatives, and polyurethanes.

As examples of stabilizers that may be present in the cosmetic composition (C1) according to the invention, mention may be made of microcrystalline waxes, and more particularly of ozokerite, and mineral salts such as sodium chloride or magnesium chloride.

As examples of thermal or mineral waters which can be combined with the composition according to the invention, mention may be made of thermal or mineral waters having a mineralization of at least 300 mg/l, in particular Avene water, Vittel water, Vichy basin water, Uriage water, La Roche-Posay water, La Bourboule water, Enghien-les-Bains water, Saint-Gervais-les-Bains water, Néris-les-Bains water, Allevard-les-Bains water, Digne water, Maizières water, Neyrac-les-Bains water, Lons-le-Saunier water, Rochefort water, Saint Christau water, Les Fumades water and Tercis-les-Bains water.

The cosmetic composition (C1) according to the invention and as defined previously is obtained by performing the preparation process comprising the following steps:

A step a) of preparing the fatty phase ($A_2$) by mixing all of the elements constituting it in the desired proportions. This mixing step is generally performed at a temperature of greater than or equal to 20° C. and less than or equal to 80° C., more particularly greater than or equal to 25° C. and less than or equal to 80° C., and even more particularly greater than or equal to 30° C. and less than or equal to 80° C.; it is performed with mechanical stirring at a moderate speed of greater than or equal to 50 rpm and less than or equal to 100 rpm;

A step b) of preparing the aqueous phase ($A_1$) from all of the elements constituting it in the desired proportions. This mixing step is generally performed at a temperature of greater than or equal to 20° C. and less than or equal to 80° C., more particularly greater than or equal to 20° C. and less than or equal to 60° C., and even more particularly greater than or equal to 20° C. and less than or equal to 40° C.; it is performed with mechanical stirring at a moderate speed of greater than or equal to 500 rpm and less than or equal to 3000 rpm; In particular, the aqueous phase ($A_1$) obtained on conclusion of step b) has a dynamic viscosity, measured at 20° C. using a Brookfield LV viscometer at a speed of 6 rpm, of greater than or equal to 200 mPa·s and less than or equal to 40 000 mPa·s, more particularly greater than or equal to 1000 mPa·s and less than or equal to 40 000 mPa·s, and even more particularly greater than or equal to 2000 mPa·s and less than or equal to 40 000 mPa·s;

A step c) during which the fatty phase (A2) is added to the aqueous phase ($A_1$) at a temperature of greater than or equal to 20° C. and less than or equal to 80° C., more particularly greater than or equal to 20° C. and less than or equal to 60° C., and even more particularly greater than or equal to 20° C. and less than or equal to 40° C., with mechanical stirring at a moderate speed of greater than or equal to 50 rpm and less than or equal to 400 rpm, so as to obtain the composition according to the invention.

DESCRIPTION OF THE PREFERRED EMBODIMENTS

The examples that follow illustrate the invention without, however, limiting it.

Preparation and Evaluation of Water-in-Oil Emulsions According to the Invention and of Comparative Water-in-Oil Emulsions.

I)—Preparation of Crosslinked Cationic Polyelectrolytes

I-1 A Self-Invertible Inverse Latex of the Copolymer APTAC/HEA/MAL(40E) (49.76/49.76/0.48) Crosslinked with MBA is Prepared as Follows:

The following are placed a beaker, with stirring:
151.0 g of permuted water;
147.9 g of hydroxyethyl acrylate;
351.0 g of a commercial solution containing 75% acrylamidopropyltrimethylammonium chloride (APTAC);
0.224 g of ethylene glycol dimethacrylate;
0.45 g of a commercial aqueous solution containing 40% sodium salt of diethylenetriaminepentaacetic acid.
An oil phase is prepared by successively mixing:
259 g of isohexadecane
20 g of sorbitan isostearate (sold under the brand name Montane™ 70 by the company SEPPIC)
5 g of Hypermer™ 2296 (sold by the company Croda)
5 g of tetraethoxylated lauryl methacrylate [MAL(40E)]
0.1 g of azobis(isobutyronitrile) (AIBN).

The aqueous phase is gradually incorporated into the organic phase and then subjected to vigorous mechanical stirring using an Ultra-Turrax™ turbomixer, to form an inverse emulsion (water/oil).

The emulsion is then cooled to about 10° C. and sparged under nitrogen for about 60 minutes to remove the oxygen. The polymerization is then initiated by incorporating therein 10 cm$^3$ of a solution of cumene hydroperoxide at 0.68% by weight in isohexadecane. After homogenization of the medium, 25 g of an aqueous solution of sodium metabisulfite at 0.1% by weight are added while allowing the temperature of the mixture to rise to the final polymerization temperature followed by stirring for 90 minutes. The resulting mixture is then cooled to about 35° C., and 40 g of lauryl alcohol ethoxylated with 7 mol (Simulsol™ P7) are then added. The desired self-invertible inverse latex (LI1) is obtained.

Analyses
Polyelectrolyte content: about 27.5% by weight
Viscosity Measurements:
  Viscosity of the self-invertible inverse latex (LI1) (Brookfield RVT, rotor 3; speed: 5 rpm): η=1280 mPa·s
  Viscosity of an aqueous solution containing 3% by weight of the self-invertible inverse latex (LI1) (Brookfield RVT, rotor 6; speed: 5 rpm): η=68 400 mPa·s
  Viscosity of an aqueous solution containing 3% by weight of the self-invertible inverse latex (LI1) and 1%0 of sodium chloride: η=14 440 mPa·s II)—Preparation and Evaluation of Water-in-Oil Emulsions According to the Invention and of Comparative Water-in-Oil Emulsions.

II-1 Preparation of Water-in-Oil Emulsions According to the Invention

A water-in-oil emulsion according to the invention, denoted ($F_1$), the mass proportions of the constituents of which are collated in table 1 below, the mass contents of the polyelectrolytes being indicated as a percentage of polymeric solids, is prepared by performing the following process:

The constituents of the fatty phase are introduced successively into a beaker, and mixed at a temperature of 20° C. using a mechanical stirrer equipped with a impeller-type stirring head at a speed of 100 rpm. The glycerol and water are mixed at room temperature in a beaker using a mechanical stirrer at a speed of 2000 rpm and the thickener is then added gradually.

The stirring is maintained for a duration which makes it possible to obtain an aqueous phase which is in the form of a homogeneous gel. The fatty phase is added in a single portion to the aqueous gel at room temperature and at a moderate stirring speed (75 to 300 rpm) using a stirrer equipped with an anchor-type stirring head. This stirring is then maintained for 10 minutes and no cooling step is necessary.

The conductivity (σ) of the comparative emulsions ($F'_1$) to ($F'_3$) is measured at 20° C., after a period of storage of said emulsions of one day in an insulated climatic chamber regulated at a temperature of 20° C., by means of an LF 196™ brand conductivity meter from the company WTW equipped with a TetraCon™ 96 electrode.

When (σ)≤0.5 μS·cm$^{-1}$, the emulsion is considered to be non-conductive and consequently the external phase is not the aqueous phase but the oily phase, and said emulsion is of water-in-oil type.

TABLE 1

| | ($F_1$) |
|---|---|
| Fatty phase | |
| Olive oil [1] | 1% |
| Triglycerides 5545 [2] | 9% |
| Euxyl™ PE9010 [3] | 1% |
| Easynov™ [4] | 2.5% |
| Aqueous phase | |
| Glycerol | 2% |
| Inverse latex (LI1) | 0.6% (p.a.m.)* |
| | i.e. 2.18% of (LI1) |
| Simulgel™ 600[5] | 0% |
| Water | q.s. 100% |
| pH adjustment | qs |
| | pH = 5.0 |
| (σ) at 1 day | ≤0.5 μS · cm$^{-1}$ |

[1] Olive oil (INCI name: *Olea Europaea* (Olive) Fruit Oil): oil used as oily phase in the preparation of the cosmetic composition;
[2] Triglycerides 5545 (INCI name: Caprylic/Capric Triglycerides): composition used as oily phase in the preparation of the cosmetic composition;
[3] Euxyl™ PE9010 (INCI name: phenoxyethanol & ethylhexylglycerol): composition used as a preserving agent;
[4] Easynov™ (INCI name: Octyldodecanol, octyldodecyl xyloside and PEG-30 dipolyhydroxystearate): emulsifying composition sold by the company SEPPIC, comprising, per 100% of its mass, from 55% to 65% by mass of 2-octyldodecanol, from 15% to 25% by mass of 2-octyldodecyl polyxyloside, from 10% to 30% by mass of PEG-30 dipolyhydroxystearate;
[5] Simulgel™ 600 (INCI name: acrylamide/sodium acryloyldimethyltaurate copolymer and isohexadecane and polysorbate 80): Inverse latex comprising, per 100% of its mass, about 35% by mass of a copolymer of partially salified acrylic acid and of the sodium salt of 2-methyl-2-[(1-oxo-2-propenyl)amino]-1-propanesulfonic acid, crosslinked with methylenebisacrylamide;
*p.a.m.: polymeric active material II-2 Preparation of Comparative Water-in-Oil and Oil-in-Water Emulsions a) A comparative water-in-oil emulsion is prepared according to the process described in paragraph II-1, denoted ($F'_1$), and of which the mass proportions of the constituents thereof are collated in table 2 below.

b) A comparative water-in-oil emulsion denoted ($F'_2$), of which the mass proportions of the constituents thereof are collated in table 2 below, is prepared according to the following process:
  the constituents of the fatty phase are introduced successively into a beaker, and mixed at a temperature of 85° C. using a mechanical stirrer equipped with an impeller-type stirring head at a speed of 100 rpm;
  water heated to 85° C. is added to the fatty phase at 85° C., followed by addition of the magnesium sulfate and the glycerol;
  The mixture obtained is maintained at 85° C. under impeller-type mechanical stirring at a speed of 100 rpm;
  The mixture is then stirred with a Silverson brand rotor-stator mechanical device at a speed of 2000 rpm for 2 minutes, and then at 8000 rpm for 2 minutes;

The mixture thus homogenized is then maintained under impeller-type mechanical stirring at a speed of 200 rpm while cooling to 20° C., and is then emptied out to obtain the water-in-oil emulsion (F'$_2$).

c) A comparative oil-in-water emulsion denoted (F'$_3$), of which the mass proportions of the constituents thereof are collated in table 2 below, is prepared according to the following process:

the constituents of the fatty phase are introduced successively into a beaker, and mixed at a temperature of 75° C. using a mechanical stirrer equipped with an impeller-type stirring head at a speed of 100 rpm;

water heated to 75° C. is added to the fatty phase at 75° C., followed by addition of the glycerol;

The inverse latex (Ll1) is then added at 75° C., and the resulting mixture is then homogenized with a Silverson brand rotor-stator mechanical device at a speed of 4000 rpm for 4 minutes, The mixture thus homogenized is then maintained under impeller-type mechanical stirring at a speed of 100 rpm for 10 minutes while cooling to 20° C., and is then emptied out to obtain the water-in-oil emulsion (F'$_3$).

d) The conductivity (σ) of the comparative emulsions (F'$_1$) to (F'$_3$) is measured at 20° C., after a period of storage of said emulsions of one day in an insulated climatic chamber regulated at a temperature of 20° C., by means of an LF 196™ brand conductivity meter from the company WTW equipped with a TetraCon™ 96 electrode.

When (σ)≤0.5 μS·cm$^{-1}$, the emulsion is considered to be non-conductive and consequently the external phase is not the aqueous phase but the oily phase, and said emulsion is of water-in-oil type.

When (σ)>0.5 μS·cm$^{-1}$, the emulsion is considered to be conductive and consequently the external phase is the aqueous phase and said emulsion is of oil-in-water type.

TABLE 2

|  | (F'$_1$) | (F'$_2$) | (F'$_3$) |
| --- | --- | --- | --- |
| Fatty phase | | | |
| Olive oil [1] | 1% | 1% | 1% |
| Triglycerides 5545 [2] | 9% | 12% | 9% |
| Euxyl ™ PE9010 [3] | 1% | 1% | 1% |
| Easynov ™ [4] | 2.5% | 4% | 0% |
| Simulsol ™ 165 [6] | 0% | 0% | 0% |
| Aqueous phase | | | |
| Glycerol | 2% | 2% | 2% |
| Simulgel ™ 600 [5] | 0.6% (p.a.m.)* i.e. 1.71% of crosslinked anionic polyelectrolyte | 0% | 0% |
| Inverse latex (Ll1) | 0% | 0% | 0.6% (p.a.m.)* i.e. 2.18% of (Ll1) |
| MgSO$_4$•7H$_2$O | 0% | 0.72% | 0% |
| Water | q.s. 100% | q.s. 100% | q.s. 100% |
| pH adjustment | qs pH = 5.0 | qs pH = 5.0 | qs pH = 5.0 |
| (σ) at 1 day | ≤0.5 μS·cm$^{-1}$ | ≤0.5 μS·cm$^{-1}$ | >0.5 μS·cm$^{-1}$ |

[6] Simulsol™ 165: INCI name PEG-100 stearate & glyceryl stearate, is a composition used as an emulsifying surfactant for preparing oil-in-water type emulsions.

II-3 Evaluation of the Emulsion and of the Comparative Water-in-Oil and Oil-in-Water Emulsions on the Combing of Locks of Hair II-3.1 Description of the Method for Evaluating the Combing of the Locks of Hair a) Preparation of the Locks of Hair "4h" type locks of damaged Caucasian hair supplied by the company Kerling International are used, which are each in the form of a lock weighing 2 g ["glued weft 4H bleached, 20 cm×2 cm/2 g color 7/0"].

For each lock, the upper part of the hair strands which remain attached (hair strands held together) is covered with orange adhesive tape to enable marking of the code. Each lock is then identified using an indelible marker by writing the last two figures of the current year, followed by the week number, followed by C and a number from 01 to 99 (e.g.: 1416C08).

In total, three locks are evaluated for each emulsion to be evaluated.

b) Test Protocol

Each lock of hair is moistened under a trickle of water, and the excess water is removed by placing two fingers on either side of the lock and exerting a downward vertical motion.

The lock is soaked, once, in a washing solution consisting of a solution containing 10% active material of sodium lauryl ether sulfate containing 2.2 mol of ethylene oxide; the excess washing solution is removed by placing two fingers on either side of the lock and exerting a downward vertical motion.

The lock is then shampooed for 30 seconds in zigzag action. Thus, the lock is placed in the palm of the directing hand while holding the lock by the top with the other hand. A horizontal to-and-fro motion is then applied with the thumb of the directing hand while drawing the lock slowly with the other hand. The thumb thus effects a zigzag motion along the lock. The lock is returned to the top between each passage and it is necessary to perform this manipulation on both sides of the lock (15 seconds for each side).

the operator must rinse his or her hands to remove all trace of washing solution before continuing the experimental protocol the lock is then rinsed with tap water for 30 seconds: 15 seconds on each side while accompanying the trickle of water twice in succession with the fingers the excess water is removed by placing two fingers on either side of the lock and exerting a downward vertical motion.

Hold the lock vertically above the workbench and, using the "fine" part of the comb, comb the lock 10 times on each side.

Check that no surfactant remains on the lock the force required to comb each lock is then evaluated by means of a Diastron MT175 machine (see below), by performing six consecutive measurements for each lock; the values obtained constitute the "control" values.

each lock is held "in the hand", holding it by the adhesive tape, and 0.2 g of test emulsion per gram of hair is applied to the upper third of the lock;

the lock is then shampooed for 30 seconds in zigzag action in the same manner as for the washing The operator then rinses his or her hands to eliminate all trace of product the lock is then rinsed with tap water for 30 seconds: 15 seconds on each side while accompanying the trickle of water twice in succession with the fingers.

the excess water is removed by placing two fingers on either side of the lock and exerting a downward vertical motion the lock is held vertically and combed 10 times on each side with the "fine" part of the comb, the force required to comb each lock is then evaluated by means of a Diastron MT175 machine (see below), by performing six consecutive measurements for each lock; the values obtained constitute the "experimental" values for each test emulsion.

c) Measurement of the Forces Required to Comb the Locks
Equipment:
A machine for measuring the forces for combing locks of hair known as a "miniature tensile tester", model MTT 175, sold by the company Diastron, equipped with UvWin software (software for piloting the MTT 175 and for data acquisition and processing) and a control unit between the MTT 175 and the UvWin software known as UV 1000 are used.

The combs used are combs sold by the company Babyliss, of the Babyliss Pro Styling Comb range (Reference 691078).

The locks used are "4h" type locks of damaged Caucasian hair sold by the company Kerling International.

Measuring Method:
The Diastron MTT 175 machine makes it possible to measure the force required to comb a lock of hair.

The method consists in attaching the lock to be evaluated to the ad-hoc device of the machine, which is also equipped with a comb attached to a mobile part; the lock is attached in the vertical position.

When a mechanism is activated, the comb travels downward along the lock and, at each point of the path, the machine records the force required to continue its progress. Thus, the machine can plot the change in combing force as a function of the distance travelled by the comb along the lock.

This protocol is performed six times for the same lock: three measurements for each side of the lock.

In total, for each lock, six control measurements are taken, namely on the lock that has been washed but not treated with the emulsion to be evaluated, and six measurements are taken on the lock that has been washed and treated with the emulsion to be evaluated.

For each measurement, it is thus possible to obtain the change in force.

Expressing and Interpreting the Results:
The measurement performed makes it possible to evaluate the change in the friction force or combing force over the length of the lock travelled by the comb from the root to the end of the hair strands.

If the friction force or combing force increases at the end of the hair strands, the user will have the impression of a product that is in effective for disentangling, even running the risk of pulling out the hair strands and/or of breaking the ends by forcing.

Ideal combing corresponds to a weak force that is as constant as possible over the entire length, from the root to the end.

For each measurement, the value of the combing force measured at 25% of the maximum recorded force, which is expressed in newtons (N), is recorded.

These forces will thus be named the control combing force (Fcont) and the combing force for the hair treated with the emulsions to be evaluated (Fexp).

If necessary, it is also possible to measure the value of the combing force in the middle of the lock and/or at the end of the lock. Thus, these forces will be named (Fmid) for the value of the combing force in the middle of the lock (after 60.1 mm of combing with the device used) and (Fend) for the value of the combing force at the end of the lock (i.e. after 159.2 mm of combing with the device used).

II-3.2 Method for Evaluating the Appearance and Stability of Water-in-Oil Emulsions According to the Invention and of Comparative Emulsions The emulsions ($F_1$) according to the invention and the comparative emulsions ($F'_1$) to ($F'_3$) are stored in an insulated climatic chamber regulated at a temperature of 20° C., for 7 days. On conclusion of this 7-day period, the appearance (APP) of each emulsion prepared is observed. The emulsions are then returned and stored in the same insulated climatic chamber regulated at a temperature of 20° C., for up to 3 months. After this period, the appearance (APP) of each emulsion prepared is observed.

II-3.3 Results Obtained for the Water-in-Oil Emulsion ($F_1$) According to the Invention and for the Comparative Emulsions (F'1) to ($F'_3$)

a) Results Obtained
The evaluation methods described in paragraphs II-3.1 and II-3.2 were applied to the water-in-oil emulsion ($F_1$) according to the invention and to the comparative emulsions ($F'_1$) to ($F'_3$). The results obtained are recorded in table 3 below.

TABLE 3

|  | ($F_1$) | ($F'_1$) | ($F'_2$) | ($F'_3$) |
| --- | --- | --- | --- | --- |
| (APP) at 7 days | Homogeneous | Homogeneous | Homogeneous | Homogeneous |
| (APP) at 1 month | Homogeneous | Homogeneous | Homogeneous | Homogeneous |
| (APP) at 3 months | Homogeneous | Homogeneous | Homogeneous | Homogeneous |
| (Fcont.) in newtons | 0.98N | 1.26N | 1.18N | 1.16N |
| (Fexp.) in newtons | 0.12N | 0.49N | 0.47N | 0.16N |
| (Fmid) in newtons | 11.8N | n.m. | n.m. | 15.8N |
| (Fend) in newtons | 13.1N | n.m. | n.m. | 45.7N | n.m. : not measured b) Analysis of the results obtained

Treatment of the locks of hair moistened with the emulsion ($F_1$) according to the invention makes it possible to reduce the combing force by 87.8% between the untreated locks (0.98 N) and the locks treated with the emulsion ($F_1$) (0.12 N), whereas the comparative emulsion ($F'_1$), which differs from the emulsion ($F_1$) only by the nature of the crosslinked polyelectrolyte used, does not allow a decrease in the combing force of 61.1% (control combing force of 1.26 N and combing force for the locks treated with ($F'_1$) of 0.49 N).

It should also be noted that the comparative water-in-oil emulsion ($F'_2$), which differs by the absence of polyelectrolyte in its formulation, does not make it possible to reduce the combing force by a value of 59.6% (control combing force of 1.18 N and combing force for the locks treated with (F'$_2$) of 0.47 N).

Only the comparative emulsion (F'$_2$) of oil-in-water type allows a reduction in combing force similar to that of the emulsion (F$_1$) according to the invention (reduction of 86.2% for a control combing force of 1.16 N and combing force for the locks treated with (F'$_3$) of 0.16 N).

However, treatment of the locks of hair with the emulsion (F$_1$) according to the invention makes it possible to obtain less combing force at the ends of the locks: 13.1 newtons for the locks of hair treated with the emulsion (F$_1$) as opposed to 45.7 newtons for the locks of hair treated with the comparative emulsion (F'$_2$).

III)—Illustrative Formulations

In the following formulations, the percentages are expressed by weight of the formulation.

III-1 Protective Color Cream

| Product name | % |
|---|---|
| Water | q.s. 100% |
| Glycerol | 2% |
| Self-invertible inverse latex (Ll1) | 1.45% |
| TEA 6% Triethanolamine | qs pH 5.5 |
| Easynov ™ | 2.50% |
| Coconut oil | 5% |
| Triglycerides 5545 (caprylic/capric triglyceride) | 5% |
| Coconut oil | 5% |
| Inula ™ HC | 1% |
| Fragrance | 0.5% |
| Tocopherol | 0.1% |
| Dissolvine ™ GL47 | 0.25% |
| Euxyl ™ PE9010 (INCI: phenoxyethanol and ethylhexylglycerol) | 1% |

III-2 Protective Nutrient Cream for Ethnic-Type Hair

| Product name | % |
|---|---|
| Water | q.s. 100% |
| Glycerol | 2% |
| Self-invertible inverse latex (Ll1) | 1.45% |
| TEA 6% triethanolamine | qs pH 5.5 |
| Easynov ™ | 2.80% |
| Shea butter | 4% |
| Argan oil | 2% |
| Emosmart ™ V21 | 5% |
| Xylishine | 3% |
| Fragrance | 0.5% |
| Tocopherol | 0.1% |
| Dissolvine GL47 | 0.25% |
| Euxyl ™ PE9010 | 1% |

III-3 Ultra-Glossy Moisturizing Serum for Normal Hair

| Product name | % |
|---|---|
| Water | q.s. 100% |
| Glycerol | 2% |
| Self-invertible inverse latex (Ll1) | 1.45% |
| TEA 6% triethanolamine | qs pH 5.5 |
| Easynov ™ | 2.0% |
| Caprylic/capric triglyceride | 2% |
| Argan oil | 1% |
| Emogreen ™ L19 | 4% |
| Xylishine ™ | 3% |
| Fragrance | 0.5% |
| Tocopherol | 0.1% |
| Dissolvinet GL47 | 0.25% |
| Euxyl ™ PE9010 | 1% |

III-4 Very Mild Botanical Cream Serum

| Product name | % |
|---|---|
| Rosa damascena flower water | q.s. 100% |
| Glycerol | 2% |
| Self-invertible inverse latex (Ll1) | 1.45% |
| Triethanolamine 6% | qs pH 5.5 |
| Easynov ™ | 2.6% |
| Argan oil | 2% |
| Coconut oil | 1% |
| Emogreen ™ L19 | 2% |
| Sodium phytate | 0.1% |
| Tocopherol | 0.25% |
| Euxyl ™ K712 sodium benzoate and potassium sorbate | 1.2% |

Easynov ™ (INCI: octyldodecanol octyldodecyl xyloside and PEG-30 dipolyhydroxystearate) is an emulsifying agent of water-in-oil type;
Inula ™ HC (INCI: caprylic/capric triglyceride - Inula crithmoides leaf/flower extract) is an active ingredient for protecting the hair against external stresses;
Dissolvine ™ GL47 (INCI: tetrasodium glutamate diacetate) is a sequestrant;
Euxyl ™ PE9010 (INCI: phenoxyethanol and ethylhexylglycerol) is a preserving agent;
Emosmart ™ V21 (INCI: C18-21 alkanes) is an emollient;
Emogreen ™ L19 (INCI: C15-19 alkanes) is an emollient;
Xylishine ™ (INCI name: xylitylglucoside (and) anhydroxylitol (and) maltitol (and) xylitol (and) Pelvetia canaliculata/extract) is an active agent for improving hair sheen;
Euxyl ™ K712 (INCI: Sodium benzoate and potassium sorbate) is a preserving agent

The invention claimed is:

1. A cosmetic composition (C1) in the form of a water-in-oil emulsion comprising, per 100% of mass:
from 60% to 95% by mass of a gelled aqueous phase (A1) comprising at least one crosslinked cationic polyelectrolyte which comprises a proportion of greater than or equal to 5 mol % of monomer units derived from an element from the group consisting of 2, N,N,N-tetramethyl-2-[(1-oxo-2-propenyl)amino]propanammonium chloride (AMP TAC), 2, N, N-trimethyl-2-[(1-oxo-2-propenyl)amino]propanammonium chloride and N,N, N-trimethyl-3-[(1-oxo-2-propenyl)amino]propanammonium chloride (APTAC),
from 5% to 40% by mass of a fatty phase (A2) comprising at least one oil and an emulsifying system comprising at least one emulsifying surfactant(S) selected from the elements of the group consisting of compositions of alkylpolyglycosides, and compositions of alkylpolyglycosides and of fatty alcohols, polyglycerol esters, alkoxylated polyglycerol esters, polyglycol polyhydroxystearates, polyglycerol polyhydroxystearates, and alkoxylated polyglycerol polyhydroxystearates,
wherein the crosslinked cationic polyelectrolyte (CP) comprises, per 100 mol %:
a1) from 5 mol % to 60 mol % of monomer units derived N,N,N-trimethyl-3-[(1-oxo-2-propenyl)amino]propanammonium chloride (APTAC);
a2) from 0.1 mol % to 5 mol % of monomer units derived from tetraethoxylated lauryl methacrylate;
a3) from 35 mol % to 94.9 mol % of monomer units derived from 2-hydroxyethyl acrylate;
a4) a proportion of greater than 0 mol % and less than or equal to 1 mol % of monomer units derived from at least one diethylenic or polyethylenic crosslinking monomer (AR);

the sum of said molar proportions of monomer units according to a1), a2), a3) and a4) being equal to 100 mol %.

2. The composition (C1) as defined in claim 1, wherein the gelled aqueous phase (A1) comprises, per 100% of mass, from 0.1% to 7% by mass of a crosslinked cationic polyelectrolyte (CP) and from 93% to 99.9% by mass of water.

3. The cosmetic composition (C1) as defined in claim 1, wherein said crosslinked cationic polyelectrolyte (CP) is a terpolymer of N,N,N-trimethyl-3-[(1-oxo-2-propenyl)amino]propanammonium chloride (APTAC), of 2-hydroxyethyl acrylate and of tetraethoxylated lauryl methacrylate crosslinked with trimethylolpropane triacrylate or with ethylene glycol dimethacrylate or with ethylene glycol diacrylate.

4. The composition (C1) as defined in claim 1, wherein said crosslinked cationic polyelectrolyte (CP) includes, per 100 mol %:
from 45 mol % to 60 mol % of monomer units derived from N,N,N-trimethyl-3-[(1-oxo-2-propenyl)amino]propanammonium chloride
from 0.5 mol % to 3 mol % of monomer units derived from tetraethoxylated lauryl methacrylate, and
from 37 mol % to 54.5 mol % of monomer units derived from 2-hydroxyethyl acrylate.

5. The cosmetic composition (C1) as defined in claim 1, wherein said emulsifying system(S) consists of an alkylpolyglycoside composition (C2) represented by formula (VII):

$$R_1\text{—O-}(G)_x\text{-H} \quad (VII)$$

in which x represents a decimal number between 1.05 and 2.5, G represents a xylose residue, and $R_1$ represents a 2-octyldodecyl radical, said composition $(C_1)$ consisting of a mixture of compounds represented by formulae $(VII_1)$, $(VII_2)$, $(VII_3)$, $(VII_4)$ and $(VII_5)$:

$$R_1\text{—O-}(G)_1\text{-H} \quad (VII_1)$$
$$R_1\text{—O-}(G)_2\text{-H} \quad (VII_2)$$
$$R_1\text{—O-}(G)_3\text{-H} \quad (VII_3)$$
$$R_1\text{—O-}(G)_4\text{-H} \quad (VII_4)$$
$$R_1\text{—O-}(G)_5\text{-H} \quad (VII_5)$$

in the respective molar proportions $a_1$, $a_2$, $a_3$, $a_4$ and $a_5$, such that:
the sum $a_1+a_2+a_3+a_4+a_5$ is equal to 1, and that
the sum $a_1+2a_2+3a_3+4a_4+5a_5$ is equal to x.

6. The cosmetic composition (C1) as defined in claim 1, wherein said emulsifying system(S) consists of a composition (C3) comprising, per 100% of mass:
from 10% to 50% by mass of at least one alkylpolyglycoside composition (C2) represented by formula (VII):

$$R_1\text{—O-}(G)_x\text{-H} \quad (VII)$$

in which x represents a decimal number between 1.05 and 2.5, G represents a xylose residue, and $R_1$ represents a 2-octyldodecyl radical, said composition consisting of a mixture of compounds represented by formulae $(VII_1)$, $(VII_2)$, $(VII_3)$, $(VII_4)$ and $(VII_5)$:

$$R_1\text{—O-}(G)_1\text{-H} \quad (VII_1)$$
$$R_1\text{—O-}(G)_2\text{-H} \quad (VII_2)$$
$$R_1\text{—O-}(G)_3\text{-H} \quad (VII_3)$$
$$R_1\text{—O-}(G)_4\text{-H} \quad (VII_4)$$
$$R_1\text{—O-}(G)_5\text{-H} \quad (VII_5)$$

in the respective molar proportions $a_1$, $a_2$, $a_3$, $a_4$ and $a_5$, such that:
the sum $a_1+a_2+a_3+a_4+a_5$ is equal to 1, and that
the sum $a_1+2a_2+3a_3+4a_4+5a_5$ is equal to x; and
from 90% to 50% by mass of at least one fatty alcohol of formula (VIII):

$$R'_1\text{—OH} \quad (VIII),$$

in which $R'_1$ represents a 2-octyldodecyl radical.

7. The cosmetic composition (C1) as defined in claim 1, wherein said emulsifying system(S) consists of a composition (C4) comprising, per 100% of its mass:
from 15% to 25% by mass of at least one composition (C2) represented by formula (VII):

$$R1\text{-O-}(G)_x\text{-H} \quad (VII)$$

in which x represents a decimal number between 1.05 and 2.5, G represents a xylose residue, and R1 represents a 2-octyldodecyl radical, said composition $(C_1)$ consisting of a mixture of compounds represented by formulae $(VII_1)$, $(VII_2)$, $(VII_3)$, $(VII_4)$ and $(VII_5)$:

$$R_1\text{—O-}(G)_1\text{-H} \quad (VII_1)$$
$$R_1\text{—O-}(G)_2\text{-H} \quad (VII_2)$$
$$R_1\text{—O-}(G)_3\text{-H} \quad (VII_3)$$
$$R_1\text{—O-}(G)_4\text{-H} \quad (VII_4)$$
$$R_1\text{—O-}(G)_5\text{-H} \quad (VII_5)$$

in the respective molar proportions $a_1$, $a_2$, $a_3$, $a_4$ and $a_5$, such that:
the sum $a_1+a_2+a_3+a_4+a_5$ is equal to 1, and that
the sum $a_1+2a_2+3a_3+4a_4+5a_5$ is equal to x;
from 55% to 65% by mass of at least one fatty alcohol of formula (VIII):

$$R'_1\text{—OH} \quad (VIII),$$

in which $R'_1$ represents a 2-octyldodecyl radical;
from 10% to 30% by mass of at least one polyglycol polyhydroxystearate represented by formula (XI):

$$Z_2\text{—O}\underset{R4}{\underbrace{\phantom{XXXXX}}}\text{O}\Big]_{y2}\text{—}Z'_2 \quad (XI)$$

in which $y_2$ represents an integer greater than or equal to 2 and less than or equal to 50, $R_4$ represents a hydrogen atom, a methyl radical or an ethyl radical, and $Z_2$ represents a radical of formula (XII):

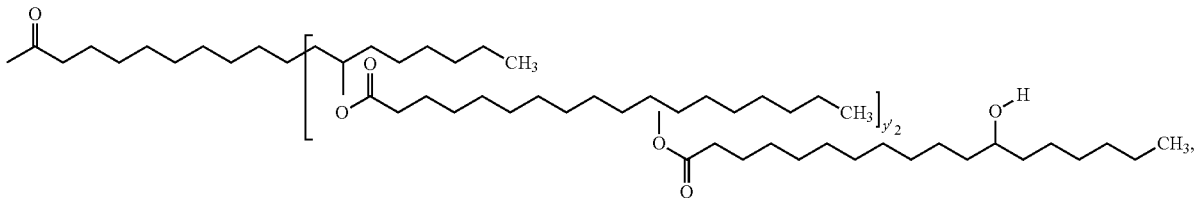

in which $y'_2$ represents an integer greater than or equal to 0 and less than or equal to 10, and $Z'_2$ represents a radical of formula (XII) as defined above, where $Z_2'$ may be identical to or different from $Z_2$, or a hydrogen atom.

8. A method for improving the combing of locks of hair, comprising applying an effective amount of the cosmetic composition of claim 1 to the hair.

9. The cosmetic composition (C1) as defined in claim 1, wherein said emulsifying system(S) consists of a composition (C4) comprising, per 100% of mass:
from 15% to 25% by mass of at least one composition (C2) represented by formula (VII):

R1-O-(G)$_x$-H  (VII)

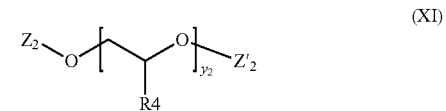

in which $y_2$ represents an integer greater than or equal to 2 and less than or equal to 50, $R_4$ represents a hydrogen atom, a methyl radical or an ethyl radical, and $Z_2$ represents a radical of formula (XII):

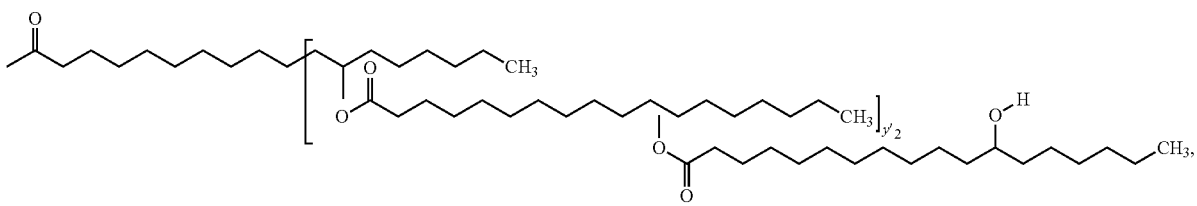

in which x represents a decimal number between 1.05 and 2.5, G represents a xylose residue, and R1 represents a 2-octyldodecyl radical, said composition (C$_1$) consisting of a mixture of compounds represented by formulae (VII$_1$), (VII$_2$), (VII$_3$), (VII$_4$) and (VII$_5$):

R$_1$—O-(G)$_1$-H  (VII$_1$)

R$_1$—O-(G)$_2$-H  (VII$_2$)

R$_1$—O-(G)$_3$-H  (VII$_3$)

R$_1$—O-(G)$_4$-H  (VII$_4$)

R$_1$—O-(G)$_5$-H  (VII$_5$)

in the respective molar proportions a$_1$, a$_2$, a$_3$, a$_4$ and a$_5$, such that:
the sum a$_1$+a$_2$+a$_3$+a$_4$+a$_5$ is equal to 1, and that
the sum a$_1$+2a$_2$+3a$_3$+4a$_4$+5a$_5$ is equal to x;
from 55% to 65% by mass of at least one fatty alcohol of formula (VIII):

R'$_1$—OH  (VIII), in which R'$_1$ represents a 2-octyldodecyl radical;
from 10% to 30% by mass of at least one polyglycol polyhydroxystearate represented by formula (XI):

in which $y'_2$ represents an integer greater than or equal to 1 and less than or equal to 10, and $Z'_2$ represents a radical of formula (XII) as defined above, where $Z_2'$ may be identical to or different from $Z_2$, or a hydrogen atom.

10. The cosmetic composition (C1) as defined in claim 2, wherein said crosslinked cationic polyelectrolyte (CP) is a terpolymer of N,N,N-trimethyl-3-[(1-oxo-2-propenyl)amino]propanammonium chloride (APTAC), of 2-hydroxyethyl acrylate and of tetraethoxylated lauryl methacrylate crosslinked with trimethylolpropane triacrylate or with ethylene glycol dimethacrylate or with ethylene glycol diacrylate.

11. The composition (C$_1$) as defined in claim 2, wherein said crosslinked cationic polyelectrolyte (CP) includes, per 100 mol %:
from 45 mol % to 60 mol % of monomer units derived from N,N,N-trimethyl-3-[(1-oxo-2-propenyl)amino]propanammonium chloride
from 0.5 mol % to 3 mol % of monomer units derived from tetraethoxylated lauryl methacrylate, and
from 37 mol % to 54.5 mol % of monomer units derived from 2-hydroxyethyl acrylate.

12. The cosmetic composition (C1) as defined in claim 1, wherein component a4) is a diethylenic crosslinking monomer (AR).

* * * * *